United States Patent
Lee, Jr. et al.

(10) Patent No.: US 8,126,596 B1
(45) Date of Patent: Feb. 28, 2012

(54) APPARATUS FOR INSPECTING A GROUP OF CONTAINERS AND METHOD OF USING SAME

(75) Inventors: James H. Lee, Jr., Edgewood, NM (US); Jonathan R. Salton, Albuquerque, NM (US); Barry L. Spletzer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 591 days.

(21) Appl. No.: 12/348,926

(22) Filed: Jan. 6, 2009

(51) Int. Cl.
*G05D 1/00* (2006.01)
(52) U.S. Cl. .............................................. 701/2; 701/24
(58) Field of Classification Search .................. None
See application file for complete search history.

(56) References Cited

U.S. PATENT DOCUMENTS

| | | | |
|---|---|---|---|
| 5,642,087 A | 6/1997 | Crow | |
| 5,809,099 A * | 9/1998 | Kim et al. | 376/249 |
| 5,819,863 A * | 10/1998 | Zollinger et al. | 180/6.5 |
| 6,175,120 B1 | 1/2001 | McGregor et al. | |
| 6,247,546 B1 | 6/2001 | Spletzer et al. | |
| 6,308,791 B1 | 10/2001 | Spletzer et al. | |
| 6,344,650 B1 | 2/2002 | Lee et al. | |
| 6,373,064 B1 | 4/2002 | Yao et al. | |
| 6,377,878 B1 | 4/2002 | Feddema et al. | |
| 6,408,226 B1 | 6/2002 | Byrne et al. | |
| 6,438,456 B1 | 8/2002 | Feddema et al. | |
| 6,480,141 B1 | 11/2002 | Toth et al. | |
| 6,484,083 B1 | 11/2002 | Hayward et al. | |
| 6,523,629 B1 | 2/2003 | Buttz et al. | |
| 6,636,847 B1 | 10/2003 | Spires | |
| 6,649,915 B2 | 11/2003 | Wright et al. | |
| 6,687,571 B1 | 2/2004 | Byrne et al. | |
| 6,826,431 B2 | 11/2004 | Hurtado et al. | |
| 7,019,637 B1 | 3/2006 | Johnson et al. | |
| 7,186,987 B1 | 3/2007 | Doty et al. | |
| 7,207,102 B1 | 4/2007 | Roesler et al. | |
| 7,765,032 B2 * | 7/2010 | Huston et al. | 700/258 |
| 2002/0104693 A1 * | 8/2002 | Moore et al. | 180/9.1 |
| 2004/0112238 A1 | 6/2004 | Talbot | |
| 2006/0162610 A1 * | 7/2006 | Reboredo Losada et al. | 104/138.1 |

OTHER PUBLICATIONS

C. Lewis, J.T. Feddema, P. Klarer, "Robotic Perimeter Detection System," Proceedings of SPIE vol. 3577, Boston, MA, Nov. 3-5, 1998, pp. 14-21.
J.T. Feddema, et al., "Decentralized Control of Cooperative Robotic Vehicles: Theory and Application," IEEE Transactions on Robotics and Automation, vol. 1, No. 5, pp. 852-864, Oct. 2002.
J.E. Hurtado et al., "Convergence of Newton's Method via Lyapunov Analysis", AIAA Journal of Guidance, Control, and Dynamics, vol. 28, No. 2, pp. 363-365, Mar.-Apr. 2005.

(Continued)

*Primary Examiner* — Michael J. Zanelli
(74) *Attorney, Agent, or Firm* — Olivia J. Tsai

(57) ABSTRACT

An apparatus and method for inspecting a plurality of containers are provided. Each container has an outer surface for housing at least one material therein. The techniques provided involve at least one inspection vehicle and at least one detector. Each inspection vehicle has a plurality of wheels for movably positioning about the plurality of containers. The wheels may have at least one magnet for selectively adhering to the outer surface of at least one of the containers whereby the inspection vehicle traverses the container(s). The detector is positionable proximate at least one of the containers. The detector may be deployable from the inspection vehicle to a position adjacent the container(s). The detector has at least one sensor for measuring at least one characteristic of the plurality of containers. At least one base station may be provided for communicating with the inspection vehicle(s) and/or detector(s).

51 Claims, 7 Drawing Sheets

OTHER PUBLICATIONS

J.E. Hurtado et al., "Decentralized Control for a Swarm of Vehicles Performing Source Localization", Journal of Intelligent and and Robotic Systems 41: 1-18, 2004.

R.D. Robinett & J.E. Hurtado, "Stability and Control of Collectives Systems", Jrnl of Intelligent & Robotic Systems, vol. 39, pp. 43-55, Jan. 2004.

Feddema et al., "An Optimization Approach to Distributed Controls of Multiple Robot Vehicles," Workshop on Intelligent Miniature Robots, IEEE/RSJ Int'l Robot Conf, Oct. 3, 2003.

Feddema et al., "Stability Analysis of Decentralized Cooperative Controls," Multi-Robot Sys.: From Swarms to Intelligent Automata, Kluwer Academic Pub, pp. 133-122, 2002.

J.T. Feddema, D.A. Schoenwald, "Distributed Communication/Navigation Robot Vehicle Network," Proceedings of World Automation Congress, Orlando, Florida, Jun. 9-13, 2002.

R.H. Byrne et al., "Miniature Mobile Robots for Plume Tracking and Source Localization Research," Journal of Micromechatronics, vol. 1, No. 3, pp. 253-261, 2002.

R.H. Byrne et al., "Algorithms and Analysis of Underwater Vehicle Plume Tracing," Sandia National Laboratories Report SAND2003-2643, Jul. 2003.

D. Ferriere, "Using Technology to Bridge Maritime Security Gaps," Red Orbit, Aug. 2005.

Sandia National Labs, Radiation & Nuclear Material Detection, available on the world wide web at http://public.ca.sandia.gov/8700/projects/content.php?cid=70, 2007.

Sandia National Labs, Intelligent Systems & Robotics Center website excerpts, available on the world wide web at http://robotics.sandia.gov/home.html, Nov. 4, 2003-Jan. 17, 2008.

Sandia National Labs, Radiation Detection, available on the world wide web at http://www.ca.sandia.gov/casite/partnering/raddetection.php, 2007.

Sandia National Labs, Data Analysis for Department of Homeland Security, available on the world wide web at http://www.ca.sandia.gov/8700/projects/content.php?cid=177, 2007.

Sandia National Labs, Advanced Concepts for Detecting Special Nuclear Material, available on the world wide web at http://www.ca.sandia.gov/8700/projects/content.php?cid=176, 2007.

Sandia National Labs, Advanced Materials for Detecting Radiation, available on the world wide web at http://www.ca.sandia.gov/8700/projects/content.php?cid=175, 2007.

Sandia National Labs, Sandia Hoppers Leapfrog Conventional Wisdom About Robot Mobility, News Release, Oct. 17, 2000.

* cited by examiner

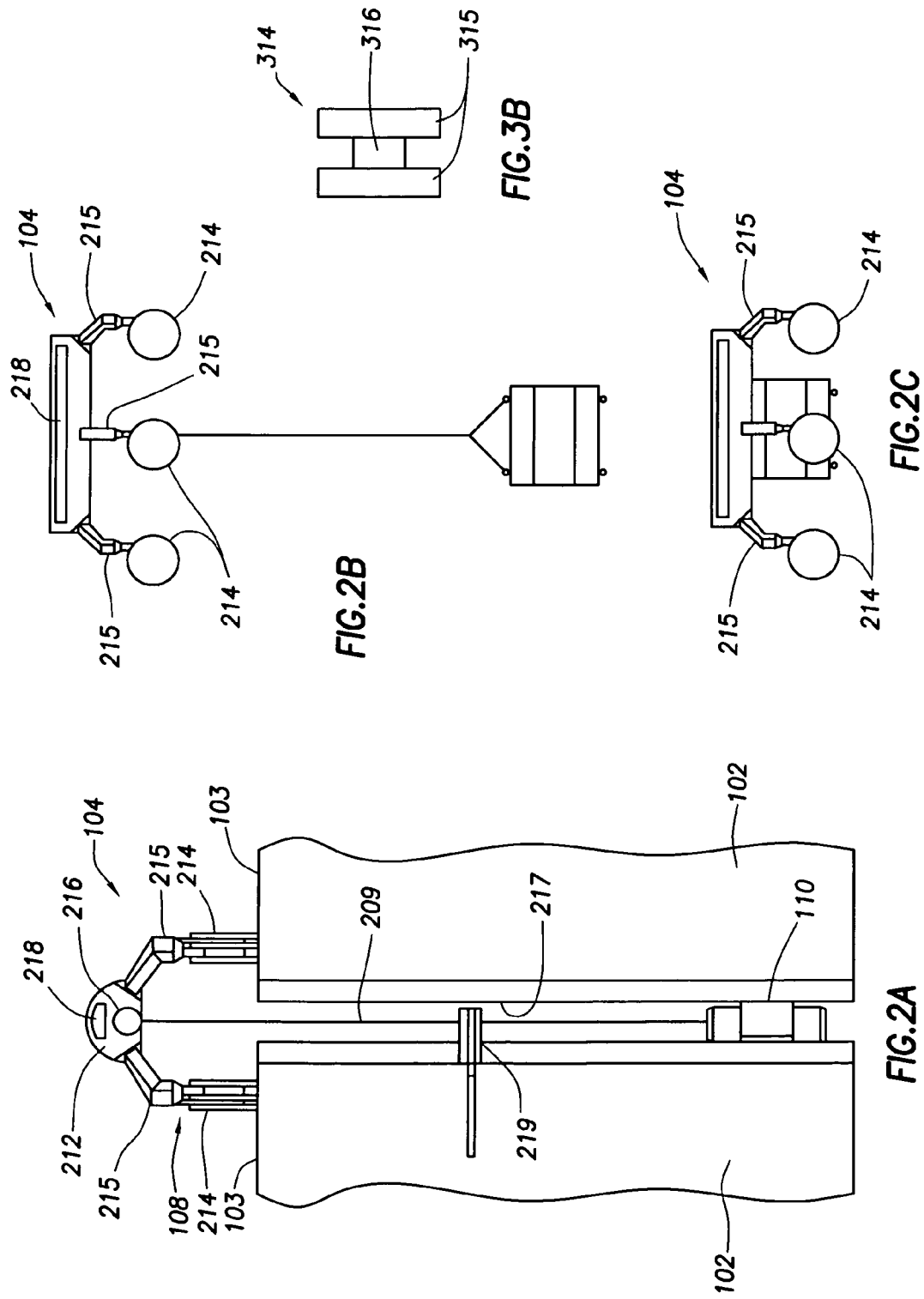

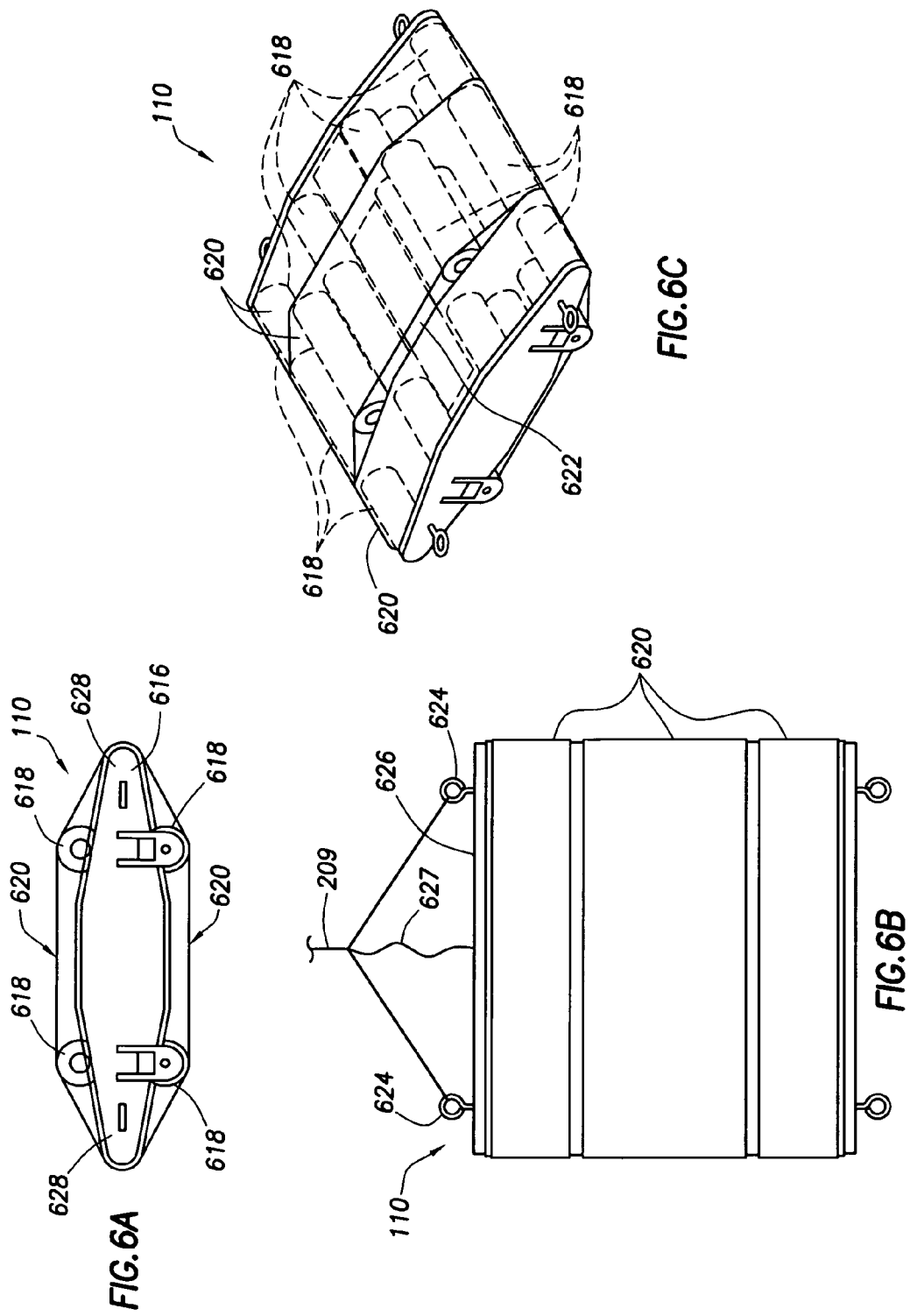

APPARATUS FOR INSPECTING A GROUP OF CONTAINERS AND METHOD OF USING SAME

STATEMENT OF GOVERNMENT INTEREST

This invention was developed under Contract DE-AC04-94AL85000 between Sandia Corporation and the U.S. Department of Energy. The U.S. Government has certain rights in the invention.

FIELD OF THE INVENTION

The present invention relates to techniques for inspecting containers. More particularly, the invention relates to techniques for detecting the presence of certain materials, such as hazardous and/or radiological materials, in a group of containers.

BACKGROUND OF THE INVENTION

Many laws govern the transport of certain materials, for example, across government borders. These laws are often enacted to protect the public from exposure to illegal or hazardous materials. In particular, the transport of hazardous materials, such as radiological materials, poses a significant threat to the public. It is, therefore, desirable to detect the presence of certain materials so that action may be taken to prevent potential dangers.

In some cases, certain materials are surreptitiously transported in containers to conceal their presence. Border inspections are often provided to identify illegal and/or hazardous materials. Cargo ships, trucks, and other transport vehicles carry a vast amount of containers into, for example, the United States every day. The vast quantity of containers transported across such borders limit the ability to examine all containers and/or detect certain materials. Moreover, manning, tools and/or facilities are often limited or unavailable for inspection of containers.

Some scanning tools have been employed, for example, at border stations to inspect incoming containers and detect illegal and/or hazardous materials. For example, radiation detectors, such as Geiger counters, have been developed to determine the presence of radiation. More recently, material sensors, such as scintillation detectors (e.g. sodium iodide, cesium iodide, lanthanum bromide detectors), isotope identifiers (e.g. GR-135), neutron counters (e.g. LLNL-developed or other fission meters), spectroscopic tools (e.g. gamma ray detectors) and other equipment, have been developed to sense the presence of radioactive materials. Examples of techniques for material sensing are described in U.S. Pat. Nos. 7,186,987, 7,019,637, 6,649,915, 6,480,141, 6,373,064, 6,344,650, and 6175120.

Material sensors typically need to be placed in proximity to a source to detect material parameters, such as those detected using the scanning tools listed above and/or other measurements, that are indicative of the presence of a specified material therein. Given the vast quantity of materials that are transported daily, such proximate placement for sensing is not always feasible. Moreover, materials are often transported in containers and/or in vessels that can be difficult to access. For example, cargo ships often contain a large number of heavy containers that are lifted by crane and stacked in a cargo hold. The placement and structure of containers may make it challenging for sensors to detect materials housed within the containers. Accessing containers in a storage facility and/or detecting materials in the containers can be difficult and time consuming.

Techniques have been developed and/or suggested to facilitate inspection of containers. Manual devices, such as Geiger counters, have been used by individuals to scan containers. Stationary devices have been developed to place sensors at certain locations to inspect materials as they pass the sensor. For example, suggestions have been made to instrument cargo ships with sensors, or to position sensors in vessel cargo bays, to detect certain materials. Techniques have also been suggested to deploy mobile robots. Some robotic techniques may involve cooperative robotics, tandem robots or robotic swarms. Examples of robotic techniques are described in US Patent/Publication Nos. 20040112238, U.S. Pat. Nos. 6,480,141, 6,438,456, 6,247,546, 6,308,791, 6,687,571, 6,523,629, 6,408,226, 6,484,083, 6,636,847, 6,826,431, and 6,377,878. While various existing detection devices and robotic techniques may be useful in certain applications, efficient inspection of containers, such as incoming cargo, remains a challenge.

Despite the development and advancement of various inspection or robotic devices, there remains a need to provide techniques for efficiently inspecting a group of containers to determine the presence of certain materials. It is desirable that such techniques enable selective positioning of inspectors having sensing capabilities at various locations on, between and/or about the containers as necessary to detect certain materials. It is further desirable that such techniques provide for cooperative inspecting of the group of containers to efficiently complete inspection. Such inspectors would preferably provide one or more of the following features/functions, among others: selective positioning of the inspectors about a group of containers, extendable sensors positionable proximate even remote containers, means for traversing containers or other obstacles to position the inspectors in a known and/or desired position, cooperatively inspecting a group of containers, data processing and/or analysis (locally and/or remotely), and communication (e.g. data and/or commands) between the inspector(s) and/or external sources. Such desired techniques and/or features are not known to exist in the prior art.

SUMMARY OF THE INVENTION

In at least one aspect, the present invention relates to an apparatus for inspecting a plurality of containers. Each container has an outer surface for housing at least one material therein. The apparatus includes at least one inspection vehicle and at least one detector extendable from the inspection vehicle. Each inspection vehicle has a plurality of wheels for movably positioning about the plurality of containers. The wheels have at least one magnet for selectively adhering to the outer surface of at least one of the containers whereby the inspection vehicle traverses the container(s). Each detector is positionable proximate at least one of the containers. Each detector has at least one sensor for measuring at least one characteristic of the containers.

In another aspect, the present invention relates to an apparatus for inspecting a plurality of containers. Each container has an outer surface for housing at least one material therein. The apparatus includes at least one inspection vehicle and at least one deployable detector extendable from the inspection vehicle. Each inspection vehicle has a plurality of wheels for movably positioning about the plurality of containers whereby the inspection vehicle traverses the container(s). Each deployable detector is positionable proximate at least one of the containers. Each deployable detector has at least one sensor for measuring at least one characteristic of the containers.

In another aspect, the present invention relates to a method for inspecting a plurality of containers. Each container has an outer surface for housing at least one material therein. The method involves movably positioning at least one inspection vehicle having a plurality of wheels and at least one detector operatively connected thereto about the plurality of containers, traversing at least one of the containers by selectively adhering the wheels via at least one magnet to the outer surface of at least one of the containers, positioning at least one detector proximate at least one of the containers (each detector having at least one sensor), and measuring at least one characteristic of the containers via the sensor(s). The method may further involve operatively connecting a base station with the inspection vehicle(s) for communication therebetween.

Finally, in at least one aspect, the present invention relates to a method for inspecting a plurality of containers. Each container has an outer surface for housing at least one material therein. The method involves movably positioning at least one inspection vehicle having a plurality of wheels about the plurality of containers, extending at least one deployable detector from the inspection vehicle(s) to a position proximate at least one of the containers (each deployable detector having at least one sensor), and measuring at least one characteristic of the containers via the sensor(s). The method may further involve operatively connecting a base station with the inspection vehicle(s) for communication therebetween.

Other aspects and advantages of the invention will be apparent from the following description and the appended claims.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIGS. 2A-C depict the inspector of FIG. 1 in greater detail, the inspector having an inspection vehicle with a deployable detector extendable therefrom. FIG. 2A is a schematic view of a front end of the inspector positioned on two containers with a deployable detector extended to a deployed position between the containers. FIG. 2B is a side view of the inspector of FIG. 2A with the deployable detector in a deployed position. FIG. 2C is an alternate view of the inspector of FIG. 2B with the deployable detector in a stowed position.

FIGS. 3A-3C depict the operation of the wheels of an inspection vehicle. FIG. 3A is a pictorial representation of an inspection vehicle traversing a container, the inspection vehicle having wheels in selective magnetic engagement with the outer surface of the container. FIG. 3B is a detailed view of one of the wheels of FIG. 3A. FIG. 3C is a graphical representation of the operation of the wheels of FIG. 3A as they traverse various surfaces.

FIG. 4A depicts a plurality of mobile hopping robots.

FIGS. 6A-6C are detailed views of the deployable detector of FIG. 2A, the deployable detector having a housing supporting a sensor and treads. FIG. 6A is a bottom view of the deployable detector. FIG. 6B is a side view of the deployable detector of FIG. 6A. FIG. 6C is a perspective view of the deployable detector of FIG. 6A.

DETAILED DESCRIPTION OF THE INVENTION

Figure 1:
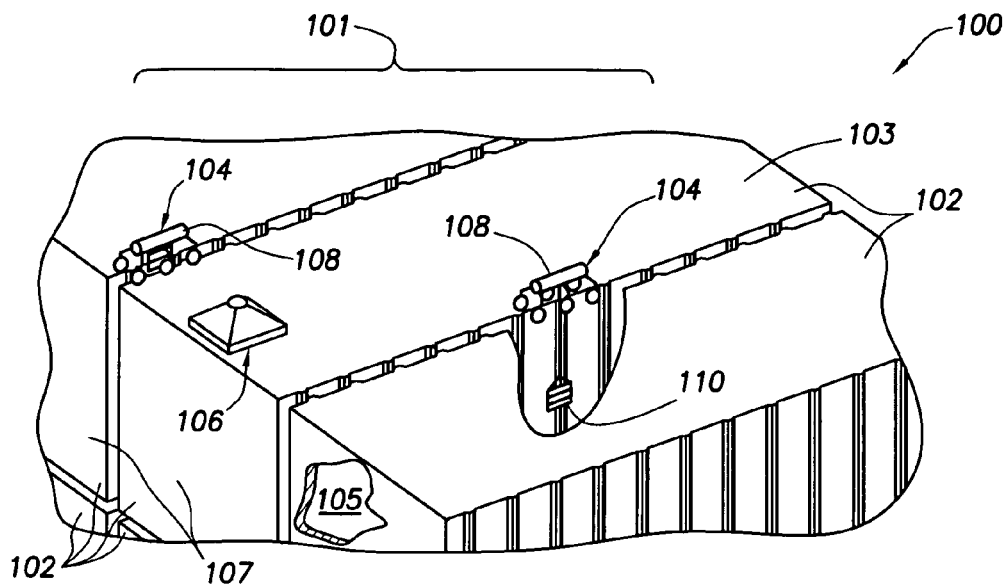
FIG. 1 is a schematic view of a plurality of containers being inspected for certain materials by an inspection system, the inspection system having two inspectors and a base station.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIG. 1 is a schematic view of a group 100 of containers 102 being inspected by an inspection system 101. As depicted, the inspection system 101 has a base station 106 interacting with two inspectors 104. The base station 106 is in communication with the inspectors 104 to pass signals, such as commands and/or data, therebetween. The base station 106 may be used to command and/or control, send information to and/or to collect data from the inspectors 104.

As shown in FIG. 1, the base station may be positioned on or about the containers. One or more base stations may be positioned at remote and/or local positions as desired to facilitate operation of, and/or communication with, the inspectors 104 and/or inspection system 101. The base station 106 is preferably capable of automatically controlling the inspectors 104. The base station may be provided with electronics (not shown) for providing communication, power, recharging and/or other functions. The base station(s) 106 may also communicate with external sources, such as databases or control stations, to gather information, process data, store information and/or to receive commands.

The inspectors 104 are adapted to maneuver about the group 100 of containers 102 to collect data relating thereto. In particular, the inspectors 104 are preferably positionable about the containers 102 for taking measurements thereof concerning the presence of specified materials. As shown, the inspectors 104 include an inspection vehicle 108 positionable about the containers 102 and a deployable detector 110 extendable from the inspection vehicle 108 to a position adjacent the containers 102 for measurement thereof.

The environment depicted shows a group 100 of containers 102 stored together in close proximity. The containers may be housed, for example, in a warehouse, vessel (e.g. cargo ship) or other storage facility. As shown, the containers may be stacked in close proximity for storage purposes. Depending on placement, the containers may be close to walls, close together, or have varying spacing. The containers may also be stacked vertically at various heights and/or in various arrangements.

Each of the containers 102 depicted is preferably capable of carrying various items (not shown), such as cargo. Each of the containers 102 preferably has an outer surface 103 defining an internal chamber 105 for housing the items. Typically, such items are goods transported in the internal chamber 105 of the containers 102. The containers 102 may be provided with doors 107 to access the internal chamber 105 of the container 102. The outer surface 103 is preferably made of metal or other magnetic material.

While the containers 102 are depicted in a specific configuration, it will be appreciated that the containers may be arranged in various configurations. The containers as depicted are rectangular in shape, but may also have different geometries, cavities, protrusions or other configurations. As mentioned previously, the containers may be housed in various storage facilities. The containers may be placed about walls, fixtures, or other items positioned within such facilities. More than one group of containers may be provided. Also, individual containers within a given group or among separate groups of containers may have varied geometries.

FIGS. 2A-C depict an inspector 104 in greater detail. The inspector 104 has an inspection vehicle 108 with a deployable detector 110 operatively connected thereto via a cable 209. FIG. 2A depicts the inspector 104 positioned on two containers 102 with the deployable detector 110 positioned in the deployed position between the containers 102. FIGS. 2B-2C depict a side view of the inspector 104 of FIG. 2B with the deployable detector 110 in the deployed and stowed position, respectively.

The inspection vehicle 108 has a body 212 operatively connected to wheels 214 via legs 215. As shown in FIG. 2A, the inspection vehicle 108 is positioned on two containers 102 with wheels 214 in contact with the outer surface 103 of each of the two containers 102. The wheels 214 are preferably adapted to roll along the outer surface 103 of the containers 102 for positioning the inspection vehicle 108 in the desired position about the containers 102. As shown, the wheels 214 may be positioned on one or more containers 102 to facilitate movement thereabout.

The inspection vehicle 108 may be maneuvered to reach a desired location about the containers 102. In some cases, the inspection vehicle(s) 108 may traverse a portion of the ground, facility floor, walls or other features to reach the desired container(s). The inspection vehicles 108 may then be positioned about the container 102 to take the desired measurements.

The inspection vehicle 108 is provided with a cable 209 with the deployable detector 110 attached at a lower end thereof. The inspection vehicle 108 is preferably adapted to selectively extend and retract the deployable detector 110 a distance below the inspection vehicle 108. The deployable detector 110 may also be selectively retracted to return the deployable detector 110 to the stowed position and/or to a desired distance below the inspection vehicle 108. The deployable detector 110 is positioned to measure characteristics, such as material properties, of the desired container(s) 102 and/or items therein to determine the presence of certain materials. The deployable detector 110 may take such measurements in the stowed or deployed positions as desired.

As shown in FIGS. 1 and 2A, the deployable detector 110 may be deployed from the inspection vehicle 108 and positioned between containers, walls and/or other features. The containers 102 of FIG. 2A have a gap 217 therebetween. The inspector 104 is positionable about the gap 217 for placement of the deployable detector 110 therein. The deployable detector 110 may be positioned at a desired depth and/or position along a container as desired. In some cases, it may be desirable to drop the deployable detector 110 a distance between containers 102 to reach additional containers 102 stacked a distance below. Measurements may be taken as the inspection vehicle 108 and/or deployable detector 110 are moved about the containers 102. The inspection vehicle 108 and/or deployable detector 110 may also be selectively positioned adjacent the desired container(s) 102 and into a position that facilitates measurement of the container(s) and/or detection of certain materials.

As shown, obstacles, such as hinge 219 may obstruct the path of the deployable detector 110 and potentially stick the deployable detector 110. Preferably, the cable 209 is capable of selectively extending and retracting the deployable detector 110 to facilitate placement of the deployable detector 110, to prevent sticking and/or to release the deployable detector 110 from pinch points. Also, the movement of the cable 209 may be manipulated alone, or in combination with the movement of the inspection vehicle 108, to free a stuck deployable detector 110.

While the deployable detector 110 is depicted as being lowered from the inspection vehicle 108 via a cable 209, it will be appreciated that any extender, such as a pulley 216 with cable 209, may be used to extend and retract the deployable detector 110 in a desired direction and a desired distance to achieve a desired position. One or more such extenders may be used in combination with one or more inspection vehicles 108. As shown, the cable 209 is operatively connected between the inspection vehicle 108 and the deployable detector 110 to gravitationally lower the deployable detector 110 to the desired depth from the inspection vehicle 108. The cable 209 may be provide with wiring to pass signals, such as power, communication, control and/or other signals, between the inspection vehicle 108 and the deployable detector 110 (see, e.g., wiring 627 of FIG. 6B).

Referring still to FIGS. 2A-2B, the body 208 of the inspection vehicle 108 may house a variety of components, such as electronics 218 and pulley 216. The electronics 218 may include instruments, such as communicators (e.g. two way radios), location indicators, power sources (e.g. batteries), drive means, processors and other features for operating the inspection vehicle 108 and/or deployable detector 110. Preferably, the electronics 218 allow for cooperative operation of an inspection vehicle 108 with other inspection vehicles and/or the base station(s) 106. The electronics 218 will be described in further detail herein.

Figure 3A:
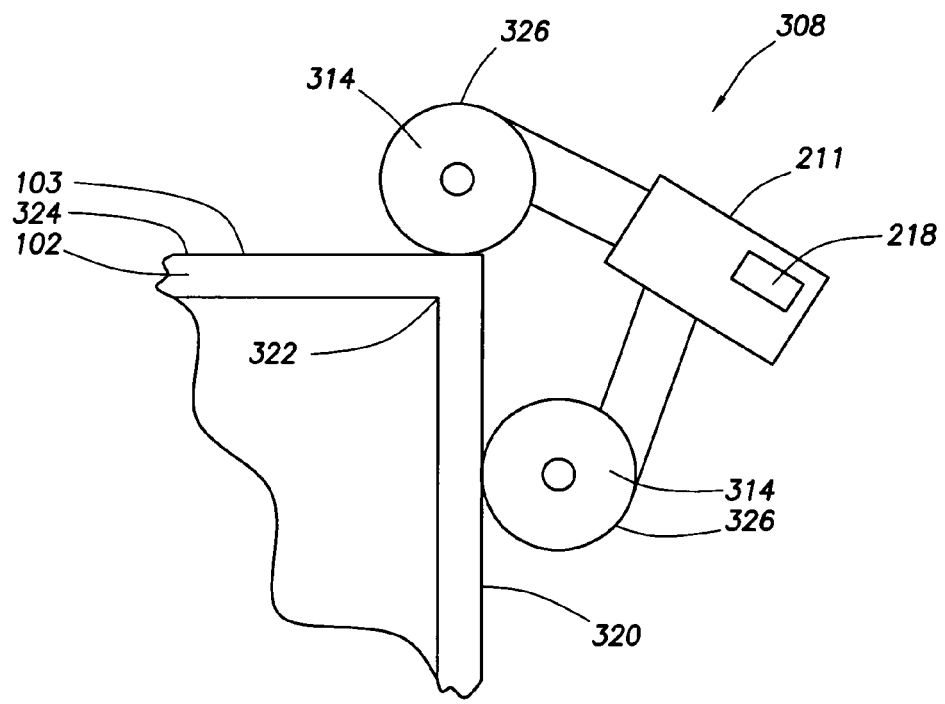
Figure 3C:
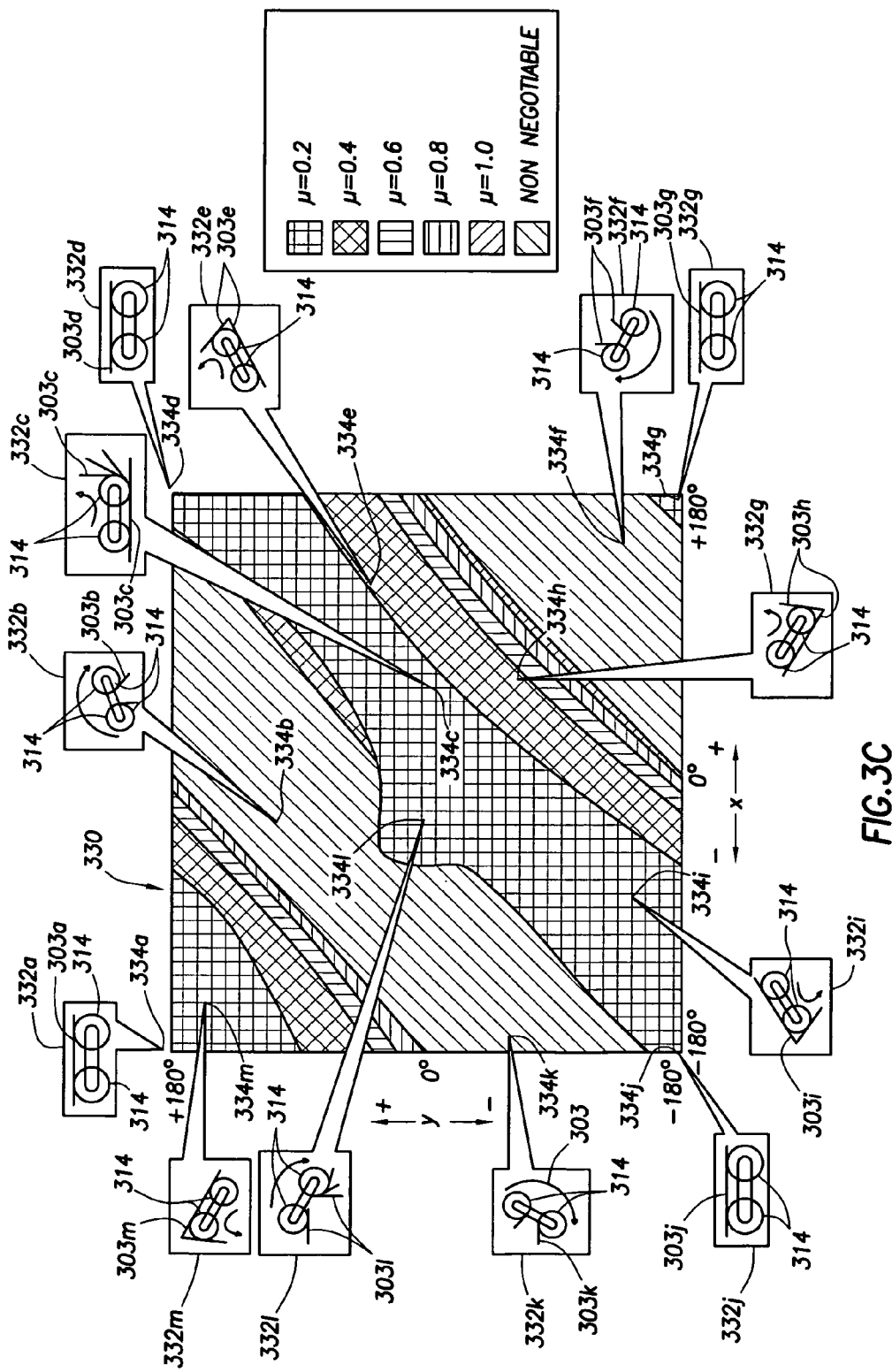

Referring now to FIGS. 3A-3C, the operation of the wheels 314 of an inspection vehicle 308 is depicted. The inspection vehicle 308 with wheels 314 may be similar to, for example, the inspection vehicle 108 with wheels 214 of FIGS. 1-2C. FIG. 3A is a pictoral representation of an inspection vehicle 308 having wheels 314 traversing a container 102. The inspection vehicle 308 is traversing the outer surface 103 of container 102 along a vertical wall 320, around a corner 322 and onto the top 324 of the container 102. The wheels 314 magnetically adhere to the metallic container 102 as the wheels 314 rotate along the outer surface of the container. Preferably, the inspection vehicle 308 is adapted to climb containers 102 and/or other obstacles to facilitate movement of about the group 100 of containers 102, traverse gaps between containers 102, and/or to achieve a specific location about the containers 102.

FIG. 3B shows one of the wheels 314 in greater detail. Each wheel 314 includes a pair of subwheels 315 with a magnet 316 positioned therebetween. The magnet 316 generates a magnetic field across the subwheels 315 to generate the necessary magnetization to adhere the wheels 314 to the container 102. Preferably, the magnetic field for the wheels 314 may be independently and selectively activated to magnetically adhere the wheels 314 to the containers 102. Preferably, the magnetic wheels provide at least three points of contact, even when traversing gaps.

The magnets 316 may be selectively manipulated to vary the magnetic field of each wheel 314 as the wheels 314 are rotationally driven along the container 102 to a desired position for measurement. By manipulating the magnetism of the various wheels 314 as they advance along the container(s) 102, the wheels 314 may be activated to 'walk' along the outer surface 103 of the container(s) 102.

The magnets 316 may be, for example one or more permanent and/or electro-magnets that may be selectively adjusted to generate the desired magnetic force. The magnets 316 may be adjusted by selectively shorting out or cancelling the magnetic field and/or by mechanically increasing the gap between the wheels 314 and the outer surface 103 of the container 102. Examples of magnetic techniques are described in U.S. Pat. Nos. 7,207,102 and 5,642,087.

FIG. 3C is a graphical representation 330 depicting the ability of a vehicle, such as inspection vehicle 308 having wheels 314, to either successfully or unsuccessfully negotiate a transition along a surface having an initial slope and a final slope as depicted in position images 332(a-m). The graphical representation 330 has an x-axis defining a final slope and a y-axis defining an initial slope, with the resulting Go/No-Go prediction for success displayed in regions along the graph. Both the x and y axes extend from −180 degrees to 180 degrees, with a positive slope indicating an uphill angle and a negative slope indicating a downhill angle.

The Go/No-Go results are displayed on the graph according to the markings as set forth in the Legend. According to the Legend, results corresponding to portions of the graph designated as 'Not Negotiable' indicate that a vehicle will be unable to traverse the surface. The Legend further indicates that results corresponding to portions of the graph designated by coefficients of friction ($\mu$) having a value of 0.2, 0.4, 0.6, 0.8, and 1.0 indicate a Go status. The value of the coefficient of friction indicates the effectiveness (e.g. difficulty or ease) of the vehicle to traverse the surface.

The graphical representation 330 includes a plurality of position images 332(a-m) and corresponding Go/No-Go predictions 334(a-m) given a specified wheel magnetic force and a corresponding coefficient of friction. The position images 332(a-m) show various positioning of the wheels 314 with respect to a surface 303 (a-m) as it transitions from an initial to a final slope. The surfaces 303(a-m) may represent, for example, various portions of an outer surface 103 of container 102. In the example shown, position images 332 a,c,d,g,i,j,l depict the wheels 314 along a magnetic surface 303 a,c,d,g, i,j,l (respectively). The vehicle mobility effectiveness for these images corresponds to a Go prediction with corresponding friction points 334 a,c,d,g,i,j,l having a coefficient of friction $\mu$=0.2. In another example, position images 332 e,h depict wheels 314 rounding a corner along a magnetic surface 303 e,h (respectively). The result for these images corresponds to a Go prediction with corresponding friction points 334 e,h having a coefficient of friction $\mu$=0.4. For a given magnetic force, the mobility effectiveness for operation involving, for example friction points 334 a,c,d,g,i,j,l having a low coefficient of friction will be low; whereas, the mobility effectiveness for operation involving, for example friction points 334 e,h, having a higher coefficient of friction will be higher.

In a final example, position images 332 b,f,k depict wheels 314 attempting to traverse a magnetic surface 303 b,f,k (respectively). The result for these images corresponds to a No-Go prediction with corresponding friction points 334 b,f, k, and falls within the Not Negotiable region thereby indicating that a coefficient of friction less than or equal to 1.0 is insufficient for negotiation between the two surfaces.

The effectiveness of the vehicle to traverse from an original to a transitional plane as shown in the position images 332(a-m) is lower as the coefficient of friction is reduced, and higher as the coefficient of friction is increased. The magnetic force may be varied as necessary to allow movement of the wheels 314 along the various planes and/or surfaces. In some cases, obstacles or other conditions may further require variation of the magnetic force. Referring back to FIG. 3A, selective activation of the magnetic force to the wheels 314 permits the selective motion of the wheels 314 and, therefore, the greater effectiveness of maneuvering and positioning the inspection vehicle 308.

Figure 4A:
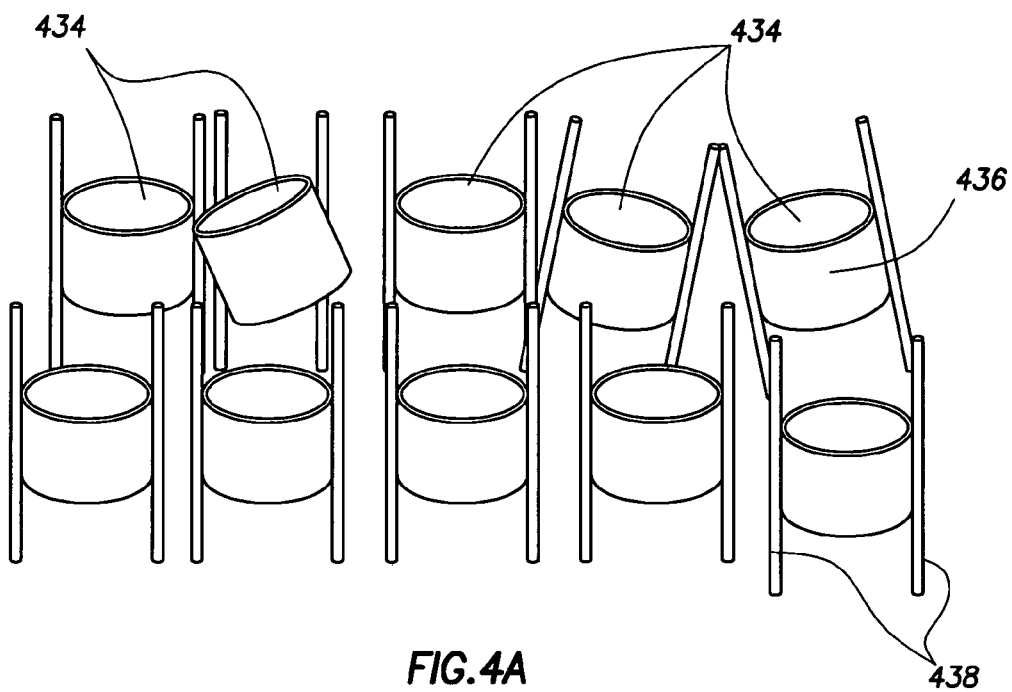
FIGS. 4A, B and C are pictorial representations of robot systems.
Figure 4B:
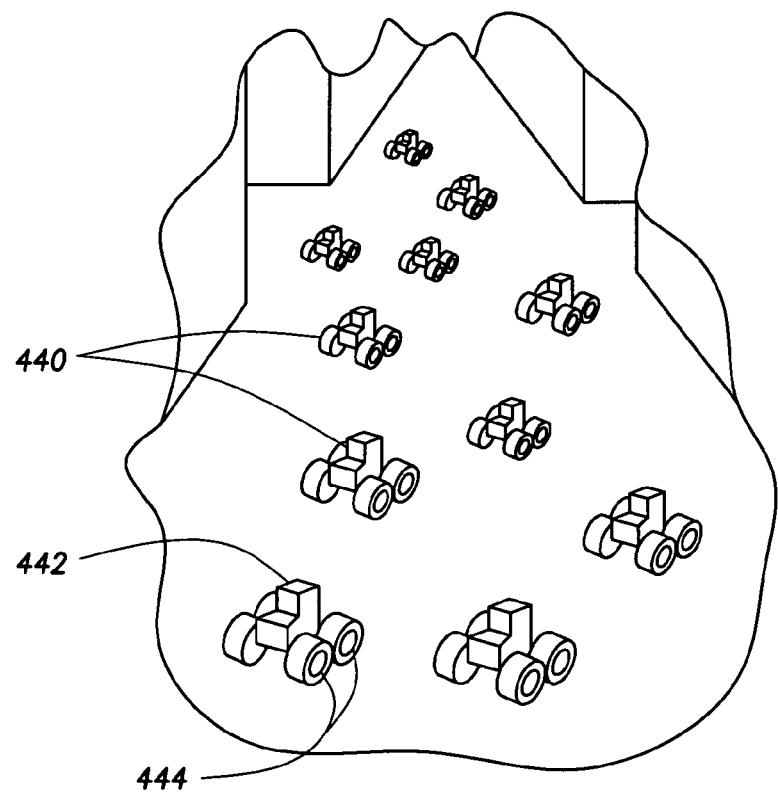
FIG. 4B depicts a plurality of wheeled robots.
Figure 4C:
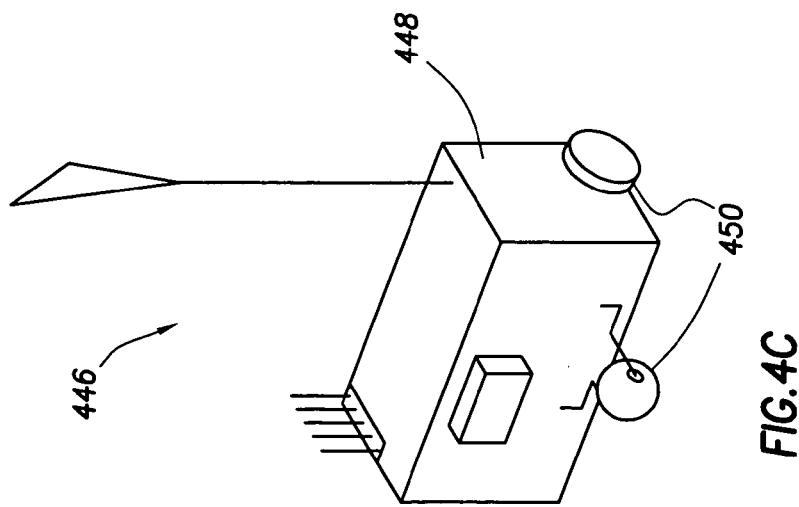
FIG. 4C depicts a miniaturized robotic vehicle.

FIGS. 4A-4C depict various robotic systems and features that may be used in connection with the present invention. FIG. 4A depicts mobile hopping robots 434 having a housing 436 positioned on two legs 438. The housing 436 is provided with electronics (not shown) capable of, for example, establishing an ad hoc network and geo-location using acoustic and RF communication. FIG. 4B depicts a group of wheeled vehicles 440 having a housing 442 positioned on four wheels 444. The housing 442 of the wheeled vehicles 440 is provided with electronics (not shown) capable of, for example, autonomously mapping an unknown building using acoustic range finding and establishing line of sight RF relay communication links. FIG. 4C depicts a miniaturized robotic vehicle 446 having a body 448 positioned on roller balls 450. The body 448 has electronics (not shown) capable of, for example, sharing information with other miniaturized robotic vehicles to make individual decisions based on the collective intelligence.

The various robotic systems depicted in FIGS. 4A-4C have various robotic functions that may be useful in the inspector 104 and/or inspection system 101. The inspector 104 preferably is provided with various features, such as communicators, cameras, batteries or other power sources, data processing and storage means and/or other features. Components and associated functions that can be used for the operation of the inspector 104 may include robotics controls, communication devices, software and hardware, etc. In particular, communication devices are preferably provided for communicating data with external sources, such as ports of origin/destination, government agencies, shipping companies, etc. Such features and/or components may be, for example, positioned in the body 211 of the inspection vehicle 108 (see, e.g., electronics 218 of FIGS. 2A and 2B). Some or all of the electronics and/or robotic features described herein may be employed in the inspector 104, inspection vehicle 108, base station 106 and/or deployable detector 110. Examples of various electronics and functions are described in US Patent/Application No. 20040112238, U.S. Pat. Nos. 6,480,141, 6,438,456, 6,247,546, 6,308,791, 6,687,571, 6,523,629, 6,408,226, 6,484,083, 6,636,847, 6,826,431, and 6,377,878.

Figure 5:
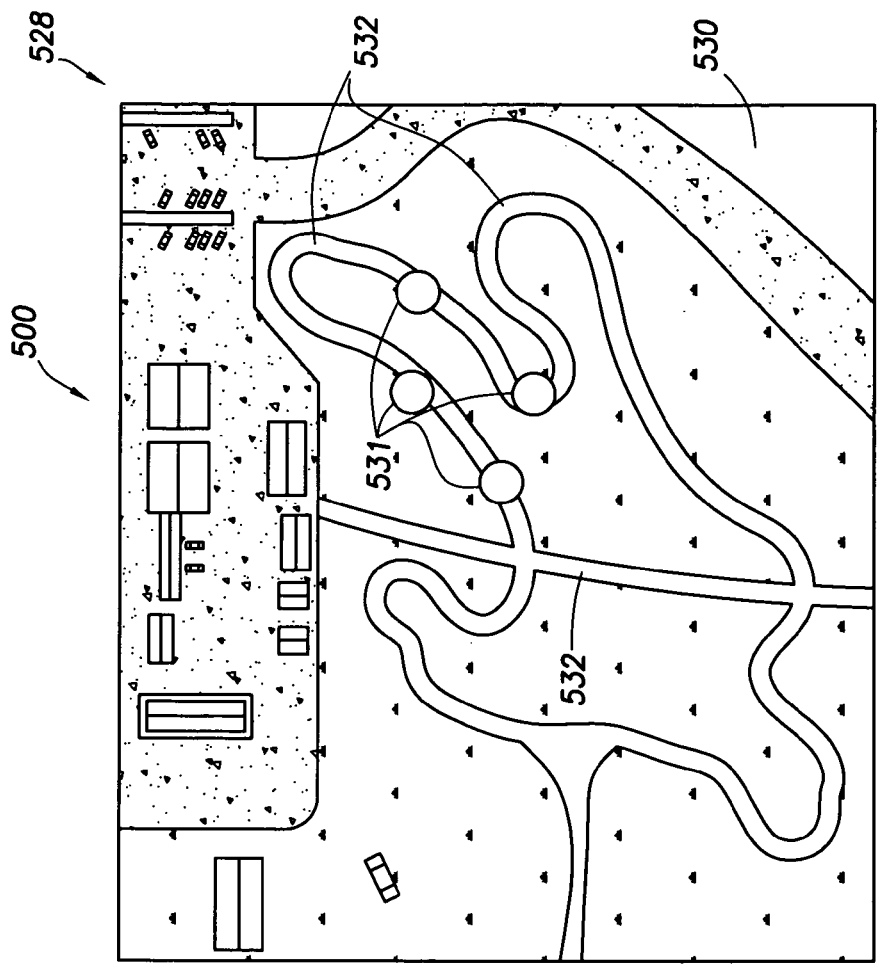
FIG. 5 is a schematic diagram depicting a robotic swarm.

FIG. 5 shows a swarm operation 500 using a swarm 528 of robots 531 about a field 530. The plurality of robots 531 are maneuvered about the field 530 along a plurality of paths 532. The plurality of robots 531 are operatively linked via a network (not shown) for cooperatively moving through the field 530 along the paths 532. Techniques relating to cooperative robotics and/or robotic swarms are shown, for example in U.S. Pat. Nos. 6,687,571, 6,523,629, 6,408,226, 6,484,083, 6,636,847, 6,826,431, and 6,377,878, the entire contents of which are hereby incorporated by reference. The inspector(s) 104 and/or inspection system 101 may implement various cooperative robotic and/or robotic swarm techniques.

FIGS. 6A-6C are detailed views of the deployable detector 110 of FIG. 2A. The deployable detector 110 has a housing 616 supporting treads 620 movably positioned about the housing 616, and a sensor 622 positioned in the housing 616.

FIGS. 6A-6C are bottom, side and perspective views, respectively, of the deployable detector 110 of FIG. 6A.

The deployable detector 110 is operatively connected to the cable 209 extended from the inspection vehicle 108 (see, e.g., FIG. 2A). As shown in FIG. 6B, the cable 209 is connected via two connectors 624 to the deployable detector 110. The connectors 624 depicted are eye hooks positioned at opposite ends of the upper surface 626 of the deployable detector 110, but any mechanism may be located in any position to support the deployable detector 110. As shown, preferably, the cable 209 (or other extender) is connected to the deployable detector 110 in a manner that facilitates positioning of the deployable detector 110 about the container(s) 102 and/or facilitates measurement by the sensor 622 (see, e.g., FIGS. 1 and 2A). Preferably, the cable 209 has wiring 627 operatively connecting the deployable detector 110 with the inspection vehicle 108 for passing signals therebetween.

The deployable detector 110 is depicted as having a rectangular surface with a varied depth. The configuration of the deployable detector 110 is preferably designed to facilitate movement of the deployable detector 110 about the containers. The shape may be configured to facilitate movement in tight places and/or maximized space for housing components, such as sensor 622. Treads 620 and rollers 618 are adapted to further facilitate movement along surfaces, such as the outer surface 103 of containers 102, as the deployable detector 110 passes (see, e.g., FIGS. 1 and 2A).

Referring back to FIGS. 6A-C, the housing 616 is depicted as supporting rollers 618 positioned about the housing 616. The rollers 618 may be used to facilitate movement of the treads 620 about the housing 616 and/or along surfaces (such as the outer surface 103 of the containers 102 of FIGS. 1 and 2A). The treads 620 are supported by the rollers 618 and slideably move about the housing 616. The rollers 618 are preferably selectively extendable from the housing 616 for positioning treads in engagement with the containers 102. The treads 620 are preferably made of an elastomeric material, such as rubber, adapted to frictionally engage the outer surface 103 of the containers 102 to facilitate movement of the deployable sensor 622 along the containers 102.

One or more such treads 620 may be used. As shown in FIG. 6A, three treads 620 are provided along the lateral width of the housing 616. Preferably as shown in FIGS. 2A and 6C, a central tread 620 is positionable adjacent a first container 102 and the side treads are positionable adjacent a second container 102. The treads 620 preferably rotate in opposite directions about the housing 616 along wheels 214 as the deployable detector 110 passes between the containers 102 to facilitate movement therebetween.

While three treads 620 with certain widths are depicted as being on multiple rollers 618 about the lateral width of the housing, it will be appreciated that various configurations of the treads 620 and/or rollers 618 may be provided to facilitate the desired movement of the deployable detector 110 about the containers 102. The treads 620 and rollers 618 are also preferably configured to prevent the deployable detector 110 from getting stuck.

The housing 616 is preferably adapted to support and protect electronics, such as sensor 622, used in the operation of the deployable detector 110. One or more such sensors 622 may be positioned in the housing 616 and/or in other portions of the inspection system 101, such as the inspection vehicle 108, or in the base station 106 (see, e.g., FIG. 1). Other electronics, such as drivers for the wheels, communicators, processors or other components, such as the electronics 218 described herein, may also be supported by the housing 616.

As shown in FIG. 6C, the sensor 622 is positioned in the housing 616 and preferably below the tread 620. One or more sensors 622 may be used to measure one or more properties of the container(s) 102. Preferably, the sensor 622 is adapted to fit the space requirements, collect measurements within a time limit and perform reliably in the inspection environment. As shown in FIG. 6C, the sensor 622 is configured to fit within the housing 616 of the deployable detector 110. Certain inspection locations have limited space thereby suggesting a smaller detector to fit within such limited spaces. Preferably, the sensor 622 and housing 616 have reduced dimensions so that the deployable detector 110 may be configurable to fit within small places about the containers 102.

The sensor 622 is also preferably capable of detecting even small quantities of materials within the contain(s) 102. The sensitivity of the sensor is preferably sufficient to allow for short dwell times for completing measurements. Certain types of sensors, such as radiation detectors, and/or the environment (e.g., land or sea) may take additional dwell times to complete the necessary measurements.

The sensor 622 may be, for example, a radiation detector and photo multiplier used to collect data. While no specific sensor is required, a preferred sensor 622 may be a radiation scintillator using, for example, sodium iodide, cesium iodide, lanthanum bromide, or other appropriate material for detecting radiation. Examples of sensing techniques that may be employed are described in U.S. Pat. Nos. 7,186,987, 7,019, 637, 6,649,915, 6,480,141, 6,373,064, 6,344,650, and 6,175, 120.

The sensors 622 may be used to collect various data concerning the operating conditions, containers, environment, etc. One or more sensors may be positioned in the inspector(s) 104, base station(s) 106 and/or at desired locations for providing additional data that may be pertinent to the inspection operation. Additional sensors may also be provided for secondary or additional inspections. The additional sensors may be the same as the sensor 622, or have certain specifications for measuring additional properties.

The sensors may optionally be networked and/or linked to a processor for analyzing the data collected. Such data may be stored in memory and/or communicated to external sources. Such external sources may be one or more inspection vehicles 108, one or more deployable detectors 110, one or more base stations 106 and/or other locations. The data may be processed to generate graphs, reports and other output as desired. Data may be communicated in real-time and/or stored. Data may be communicated to external sources, such as ports of origin/destination, government agencies, shipping companies, etc. Verification, calibration, filtration, processing, analysis, storing, displaying, communicating and other functions may be performed to manipulate the data as desired.

Figure 7:
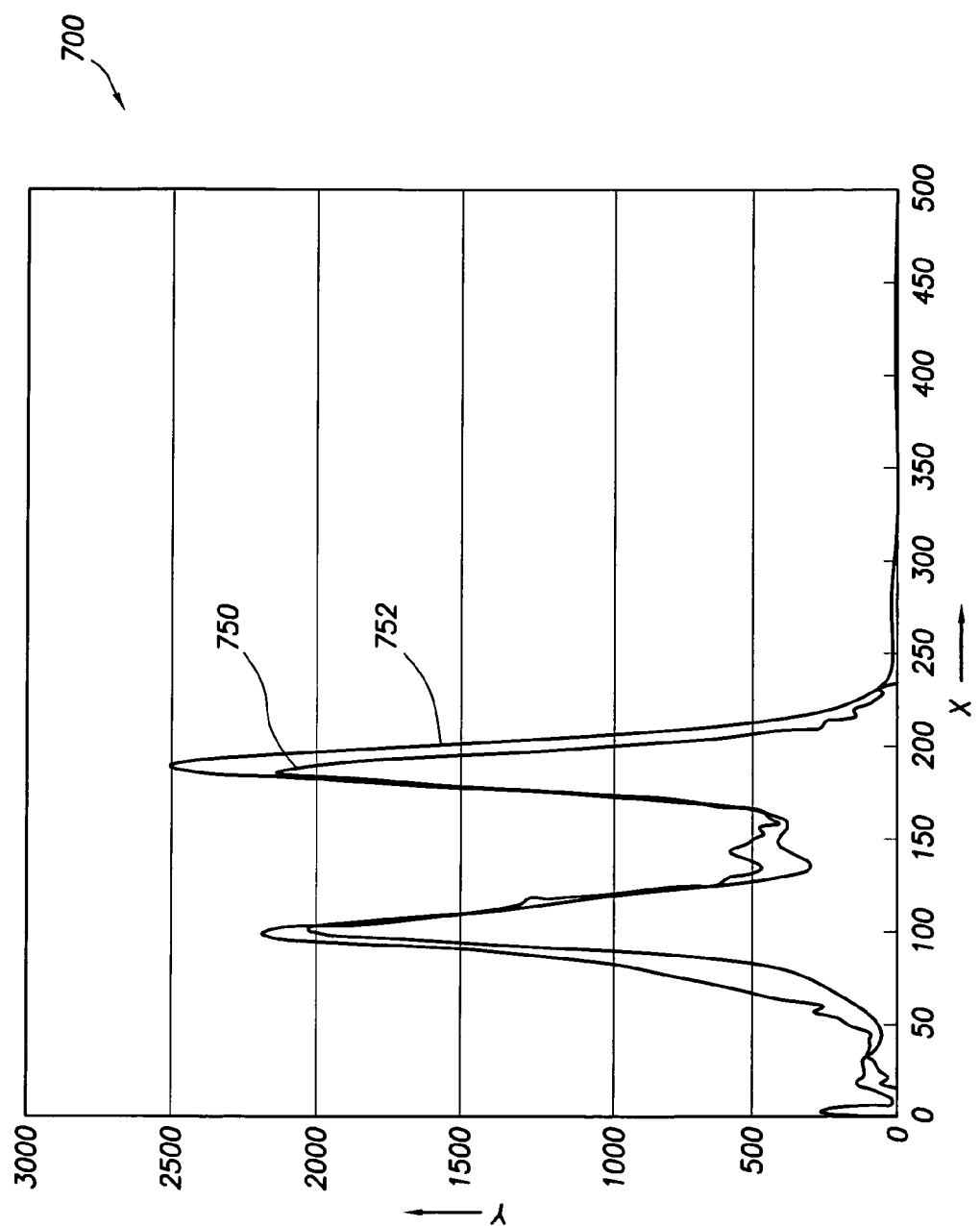
FIG. 7 is graphical representation of data collected by a radiation detector.

FIG. 7 is a line graph of measurements taken by a radiation detector, such as sensor 622, depicting pulse height distribution for an unshielded U-235 source. This graph demonstrates analysis and processing that may be performed based on the data collected, for example by sensor 622. The graphical representation includes a line graph 700 having an x-axis showing channels over a spectral volume, and a y-axis showing the counts per channel detected from a U-235 source. A first line 750 depicts the counts detected by the U-235 source along the channels measured. A second line 752 depicts a Monte Carlo distribution analysis of the data corresponding to line 750.

The Monte Carlo output provides computational modeling to extend the base of understanding of the data collected. This information may be used to monitor situations or scenarios, such as determining sensitivity to quantity and location of radiation sources within a container, discriminating data against a norm, and/or analyzing results in shielded and unshielded configurations. Further analysis may be performed based on the results generated and/or information gathered from other sources.

Measurements taken by, for example, the sensor 622 of FIG. 6 and/or other sensors used by the inspector(s) 104 and/or inspection system 101 may be processed and/or analyzed. As shown in FIG. 7, the data may also be collected, analyzed and/or graphically displayed to determine various properties, conditions or other characteristics. Depending on the sensor used and/or the desired output, various measurements and/or analysis may be performed. Examples of various techniques are described in U.S. Pat. Nos. 7,186,987, 7,019,637, 6,649,915, 6,480,141, 6,373,064, 6,344,650, and 6,175,120.

The data collected by one or more sensors may indicate certain situations, such as the presence of certain materials and/or the existence of certain conditions. For example, the data shown in FIG. 7 indicates the presence of certain radiological materials. In such situations, alarms may be set and action taken. The data may simply be, for example, an alert requiring further measurements or removal of certain containers for further examination. Additional measurements and/or inspection operations may be performed by one or more inspectors 104 to verify situations and/or to gather additional data.

In operation, the inspector(s) 104 are deployed to a position about a group 100 of containers 102 (see FIG. 1). The inspectors 104 may be operatively linked to a base station, such as base station 106, and/or other base stations. The inspectors 104 may also be linked directly to each other, or linked via the base stations. The inspectors 104 and/or base stations may be wirelessly linked via a network (not shown). As shown in FIGS. 1 and 2A, the inspectors 104 are preferably automated to maneuver to the appropriate location and deploy the deployable detectors 110 at the appropriate position for taking measurements.

Intuitive user interfaces and associated algorithms may be used to communicate with inspectors 104 via high level commands. The inspectors 104 are preferably automated to maneuver to the appropriate location and deploy the deployable detectors 110 at the appropriate location for taking measurements as shown in FIGS. 1 and 2A. However, the capability for mobility control of the inspection vehicle 108 and/or detector 110 may be provided.

As shown in FIGS. 3A-3C, the inspection vehicle 108 may be required to traverse obstacles and/or climb containers 102 to reach its desired location. To facilitate movement of the inspection vehicle 108 along the containers, wheels 214 of inspection vehicle 108 are magnetically activated to selectively adhere to the container 102 as the inspection vehicle 108 is advanced. The magnetic force of the magnets 316 of the wheels 214 is selectively activated according to the detected surface configuration. As shown in FIG. 3C, the magnetic force of the wheels may be varied based on analysis of the coefficient of friction and the surfaces being traversed by the inspection vehicle.

Once the inspection vehicle 108 is in the appropriate position, the deployable detector 110 may be extended and retracted to the appropriate depth as shown in FIGS. 2B and 2C. The inspection vehicle 104 may move along the top of the container 102 as the deployable detector 110 passes along the outer surface 103 of the container 102. As shown in FIGS. 6A-C, the deployable detector 110 has treads for sliding along the containers to facilitate movement through the gaps 217 between containers 102 (see, e.g., FIG. 2).

Depending on the configuration of the containers, the deployable detector 110 may be positioned to take measurements of multiple containers at the same time. For example as shown in FIGS. 1 and 2A, the deployable detector may be deployed into a space between rows of containers and passed along the containers as the inspection vehicle traverses along the top of the rows. In this manner, the deployable detector may measure two rows at the same time. One or more measurements may be taken as the deployable detector moves, or as it pauses for a desired dwell time at each location. One or more stops may be made along the various containers.

Part or all of the inspection process may be repeated as necessary. Once the inspection is completed, the inspectors 104 may be returned to the original position. Alternatively, additional and/or repeat measurements may be selectively taken. Preferably, data from the sensors is communicated to a base station in real time. Data may be collected, processed and analyzed before, during and/or after inspection. The inspectors 104 may analyze data and/or provide data to other sources for analysis. In cases where the data indicates a certain situation, an alert may be generated and/or action taken. Containers indicating the presence of certain materials may be re-inspected and/or retrieved for further review.

The inspectors 104 are preferably deployed in a manner that will permit fast and efficient inspection. Cooperative, tandem, swarm and/or other multiple robot techniques described herein may be utilized to plan and execute the positioning of the inspectors. The inspectors 104 are preferably deployed about the containers 102 according to a predetermined routine. The inspectors 104 may be activated to cooperatively pass about the group 100 of containers 102 to take measurements thereof. Preferably, the routines provide for fast and efficient scanning of all of the containers 102. An analysis of the containers (e.g. number, length), environment (e.g. obstacles), equipment (e.g. number of inspectors), inspection criteria (e.g. inspection location), operation time (e.g. dwell time), data collected and other inspection parameters may be performed to determine an optimized routine for performing the inspection.

Other factors, such as location of each inspector and depth of the deployable detector at a given time, may also be considered. As the inspectors 104 pass along the group of containers 102, varying conditions, measurement results, or other factors may change thereby requiring adjustment of the route and/or routines of one or more inspectors. The inspectors 104 preferably cooperatively evaluate the situation to enable optimum inspection of the containers 102. Multiple robot techniques are preferably used to consider adjusting the inspection based on changing conditions and/or collected data. Control systems may be provided to permit manipulation and/or adjustment of the inspectors and/or the inspection. For example, if an inspector 104 becomes stuck, it may be necessary for the remaining inspectors to vary their routes and/or operations to complete the additional measurements. In another example, if an inspector 104 detects certain materials, an alarm may issue requiring action with respect to certain containers. Secondary measurements of alerted containers may be required by other inspectors 104 and/or variation of existing routes may be required. The inspection time may be estimated by an assessment of the containers and their environment. By way of example, an inspection may involve a cargo ship having $N_{con}$ containers, each container having a length $L_{con}$. A required number of inspections $N_{insp}$ may be performed that require an inspection time $t_{stop}$ for each inspection. The configuration of the containers may allow for a reduced number of inspections, for example where adjacent rows of containers may be inspected simultaneously. A configuration factor $C_{fact}$ may be assigned based on the configuration. The estimated inspection time $t_{insp}$ may be determined based on the following equation:

$$t_{insp} = \frac{N_{con}}{C_{fact}} \cdot N_{insp} \cdot t_{stop} \qquad \text{Equation 1}$$

Using Equation 1 in an example involving the inspection of a cargo ship having 10,000 twenty foot long containers stacked in rows requiring three inspections on each side (six total) at one minute each, two inspections may be performed at each location and the configuration factor $C_{fact}$ is 2. The resulting inspection time $t_{insp}$ for a single inspector to complete the inspection would be 526 hours based on Equation 1.

The corresponding travel time $t_{trav}$ for the inspection may be determined based on the following equation:

$$t_{trav} = \frac{N_{con}}{C_{fact}} \cdot N_{insp} \cdot \frac{L_{con}}{V_{veh}} \qquad \text{Equation 2}$$

where inspection time $t_{insp}$ for each inspection may be estimated based on the average vehicle speed $V_{veh}$ of the inspector and the container length $L_{con}$. In the case where the containers are stacked in adjacent rows, two inspections may be performed at each location (see, e.g., deployable detector 110 of FIG. 1) and the configuration factor $C_{fact}$ is 1.9. However, the end columns are not measured twice. Thus, the $C_{fact}$ must be adjusted to account for end rows when determining travel times. Applying Equation 2 to the example involving the inspection of 10,000 twenty foot containers by a single inspector having a speed of 0.5 ft/sec, the resulting travel time based on equation 2 is 59 hours.

The total time $t_{tot}$ for inspecting all of the containers may be determined by the following equation:

$$t_{tot} = t_{insp} \cdot t_{travel} \qquad \text{Equation 3}$$

Applying Equation 2 to the example resulting in an inspection time of 526 hours and a travel time of 59 hours, the estimated total travel time would be 585 hours, or 3.5 weeks.

The duration of the inspection may significantly be reduced by using a collective of inspectors to perform the same inspection. In an example involving the inspection of 10,000 twenty foot containers by inspectors having a speed of 0.5 ft/sec, the resulting total time $t_{tot}$ would reduce to less than 2.5 days.

It will be understood from the foregoing description that various modifications and changes may be made in the preferred and alternative embodiments of the present invention without departing from its true spirit. For example, communication links may be provided to transfer data collected during inspection to external sources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for inspecting a plurality of containers, each container having an outer surface for housing at least one material therein, comprising:
    at least one inspection vehicle having a plurality of wheels for movably positioning about the plurality of containers whereby the at least one inspection vehicle traverses at least one of the plurality of containers; and
    at least one deployable detector extendable from the at least one inspection vehicle, the at least one deployable detector positionable proximate at least one of the plurality of containers, the at least one deployable detector having at least one sensor for measuring at least one characteristic of the plurality of containers, wherein the apparatus is operatively linked to at least one other similarly configured apparatus to cooperatively inspect the plurality of containers.

2. The apparatus of claim 1, wherein the plurality of wheels have at least one magnet for selectively adhering to the outer surface of at least one of the plurality of containers.

3. The apparatus of claim 1, further comprising at least one base station operatively linked to one of the at least one inspection vehicle, the at least one detector and combinations thereof for communication therewith.

4. The apparatus of claim 1, further comprising a communicator for passing signals between at least two of at least one inspection vehicle, at least one deployable detector, at least one base station and combinations thereof.

5. The apparatus of claim 4, wherein the communicator passes one of command signals, power signals, communication signals, data and combinations thereof.

6. The apparatus of claim 1, wherein the at least one inspection vehicle has electronic means for cooperative operation with another at least one inspection vehicle.

7. The apparatus of claim 1, wherein the at least one inspection vehicle is configured to maneuver the at least one inspection vehicle to a predetermined location.

8. The apparatus of claim 1, wherein the at least one deployable detector is operatively connected to the at least one inspection vehicle via a cable.

9. The apparatus of claim 8, wherein the at least one inspection vehicle has a pulley for extending and retracting the cable.

10. The apparatus of claim 8, wherein the cable is wired for the passage of signals between the at least one deployable detector and the at least one inspection vehicle.

11. The apparatus of claim 1, wherein the at least one deployable detector has at least one tread movable about the at least one deployable detector for slidable engagement with the outer surface of the plurality of containers.

12. The apparatus of claim 11, wherein the at least one deployable detector has a housing with a plurality of rollers therein, the at least one tread movably positioned about the rollers.

13. The apparatus of claim 1, wherein the at least one characteristics measured by the at least one sensor are at least one of radiation, material parameters, environmental conditions, and combinations thereof.

14. The apparatus of claim 1, further comprising a processor for analyzing data received from the at least one sensor.

15. The apparatus of claim 14, wherein the processor is positioned in one of the at least one deployable detector, the at least one inspection vehicle, at least one base station, an external source and combinations thereof.

16. The apparatus of claim 14, further comprising an alarm for providing an alert when the analyzed data meets predetermined criteria.

17. A method of inspecting a plurality of containers, each container having an outer surface for housing at least one material therein, comprising:
    movably positioning at least one inspection vehicle having a plurality of wheels about the plurality of containers, wherein at least one inspection vehicle comprises a plurality of inspection vehicles and wherein the steps of the method are cooperatively performed by a plurality of inspection vehicles according to a predetermined routine;

extending at least one deployable detector from the at least one inspection vehicle to a position proximate at least one of the plurality of containers, the at least one deployable detector having at least one sensor; and measuring at least one characteristic of the plurality of containers via the at least one sensor.

18. The method of claim 17, further comprising traversing at least one of the plurality of containers by selectively adhering the plurality of wheels via at least one magnet to the outer surface of at least one of the plurality of containers.

19. The method of claim 17, further comprising operatively linking a base station with one of at least one inspection vehicle, at least one deployable detector and combinations thereof for communication therebetween.

20. The method of claim 17, wherein the routine is revised based on one of the at least one characteristic, environmental conditions, operational inputs, and combinations thereof.

21. The method of claim 17, wherein the step of extending the at least one deployable detector comprises selectively extending the at least one deployable detector from the at least one inspection vehicle via a cable to a position proximate at least one of the plurality of containers, the at least one deployable detector having at least one sensor therein.

22. The method of claim 21, further comprising selectively retracting the at least one deployable detector.

23. The method of claim 17, wherein the at least one deployable detector is slidably positionable along the outer surface of at least one of the plurality of containers.

24. The method of claim 17, further comprising passing signals between at least two of at least one inspection vehicle, at least one deployable detector, at least one base station and combinations thereof.

25. The method of claim 17, further comprising analyzing data collected by the at least one sensor.

26. The method of claim 25, further comprising providing an alarm when the analyzed data meets predetermined criteria.

27. The method of claim 25, further comprising processing the data collected by the at least one sensor.

28. A method of inspecting a plurality of containers, each container having an outer surface for housing at least one material therein, comprising:

movably positioning at least one inspection vehicle having a plurality of wheels about the plurality of containers;

extending at least one deployable detector from the at least one inspection vehicle to a position proximate at least one of the plurality of containers, the at least one deployable detector having at least one sensor, wherein the step of extending the at least one deployable detector comprises selectively extending the at least one deployable detector from the at least one inspection vehicle via a cable to a position proximate at least one of the plurality of containers, the at least one deployable detector having at least one sensor therein; and measuring at least one characteristic of the plurality of containers via the at least one sensor.

29. The method of claim 28, further comprising traversing at least one of the plurality of containers by selectively adhering the plurality of wheels via at least one magnet to the outer surface of at least one of the plurality of containers.

30. The method of claim 28, further comprising operatively linking a base station with one of at least one inspection vehicle, at least one deployable detector and combinations thereof for communication therebetween.

31. The method of claim 28, further comprising selectively retracting the at least one deployable detector.

32. The method of claim 28, wherein the at least one deployable detector is slidably positionable along the outer surface of at least one of the plurality of containers.

33. The method of claim 28, further comprising passing signals between at least two of at least one inspection vehicle, at least one deployable detector, at least one base station and combinations thereof.

34. The method of claim 28, further comprising analyzing data collected by the at least one sensor.

35. The method of claim 34, further comprising providing an alarm when the analyzed data meets predetermined criteria.

36. The method of claim 34, further comprising processing the data collected by the at least one sensor.

37. An apparatus for inspecting a plurality of containers, each container having an outer surface for housing at least one material therein, comprising:

at least one inspection vehicle having a plurality of wheels for movably positioning about the plurality of containers whereby the at least one inspection vehicle traverses at least one of the plurality of containers, wherein the at least one inspection vehicle has electronic means for cooperative operation with another at least one inspection vehicle; and at least one deployable detector extendable from the at least one inspection vehicle, the at least one deployable detector positionable proximate at least one of the plurality of containers, the at least one deployable detector having at least one sensor for measuring at least one characteristic of the plurality of containers.

38. The apparatus of claim 37, wherein the plurality of wheels have at least one magnet for selectively adhering to the outer surface of at least one of the plurality of containers.

39. The apparatus of claim 37, further comprising at least one base station operatively linked to one of the at least one inspection vehicle, the at least one detector and combinations thereof for communication therewith.

40. The apparatus of claim 37, further comprising a communicator for passing signals between at least two of at least one inspection vehicle, at least one deployable detector, at least one base station and combinations thereof.

41. The apparatus of claim 40, wherein the communicator passes one of command signals, power signals, communication signals, data and combinations thereof.

42. The apparatus of claim 37, wherein the at least one inspection vehicle is configured to maneuver the at least one inspection vehicle to a predetermined location.

43. The apparatus of claim 37, wherein the at least one deployable detector is operatively connected to the at least one inspection vehicle via a cable.

44. The apparatus of claim 43, wherein the at least one inspection vehicle has a pulley for extending and retracting the cable.

45. The apparatus of claim 43, wherein the cable is wired for the passage of signals between the at least one deployable detector and the at least one inspection vehicle.

46. The apparatus of claim 37, wherein the at least one deployable detector has at least one tread movable about the at least one deployable detector for slidable engagement with the outer surface of the plurality of containers.

47. The apparatus of claim 46, wherein the at least one deployable detector has a housing with a plurality of rollers therein, the at least one tread movably positioned about the rollers.

48. The apparatus of claim 37, wherein the at least one characteristics measured by the at least one sensor are at least one of radiation, material parameters, environmental conditions, and combinations thereof.

49. The apparatus of claim 37, further comprising a processor for analyzing data received from the at least one sensor.

50. The apparatus of claim 49, wherein the processor is positioned in one of the at least one deployable detector, the at least one inspection vehicle, at least one base station, an external source and combinations thereof.

51. The apparatus of claim 49, further comprising an alarm for providing an alert when the analyzed data meets predetermined criteria.

* * * * *